(12) United States Patent
Anderson

(10) Patent No.: US 7,294,220 B2
(45) Date of Patent: Nov. 13, 2007

(54) METHODS OF STABILIZING AND/OR SEALING CORE MATERIAL AND STABILIZED AND/OR SEALED CORE MATERIAL

(75) Inventor: Alan H. Anderson, Placentia, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 0 days.

(21) Appl. No.: 10/965,853

(22) Filed: Oct. 18, 2004

(65) Prior Publication Data

US 2005/0161154 A1 Jul. 28, 2005

Related U.S. Application Data

(60) Provisional application No. 60/511,321, filed on Oct. 16, 2003.

(51) Int. Cl.
*B32B 37/12* (2006.01)
*B32B 38/00* (2006.01)
*B32B 38/10* (2006.01)

(52) U.S. Cl. .................. 156/213; 156/250; 156/285; 156/307.1

(58) Field of Classification Search ............... 156/290, 156/291, 307.3
See application file for complete search history.

(56) References Cited

U.S. PATENT DOCUMENTS

| | | | |
|---|---|---|---|
| 2,517,902 A | | 8/1950 | Luebkeman |
| 3,490,977 A | * | 1/1970 | Lincoln ................ 156/285 |
| 3,700,522 A | * | 10/1972 | Wonderly ............. 156/197 |
| 3,707,583 A | * | 12/1972 | McKown .............. 427/486 |
| 3,817,810 A | * | 6/1974 | Ronan et al. .......... 156/297 |
| 4,445,956 A | * | 5/1984 | Freeman et al. ....... 156/154 |
| 4,598,007 A | * | 7/1986 | Kourtides et al. ..... 428/116 |
| 4,604,319 A | * | 8/1986 | Evans et al. .......... 442/164 |
| 4,608,103 A | * | 8/1986 | Aldrich ................. 156/64 |
| 4,783,232 A | | 11/1988 | Carbone et al. |
| 4,822,444 A | | 4/1989 | Weingart et al. |
| 4,869,761 A | | 9/1989 | Weingart et al. |
| 4,907,754 A | | 3/1990 | Vaniglia |

(Continued)

FOREIGN PATENT DOCUMENTS

EP 0 366 979 * 5/1990

(Continued)

OTHER PUBLICATIONS

John Berry, International Search Report for International application No. PCT/US 01/43091, (Jul. 17, 2002).

(Continued)

*Primary Examiner*—Melvin Mayes
(74) *Attorney, Agent, or Firm*—Finnegan, Henderson, Farabow, Garrett & Dunner LLP

(57) ABSTRACT

The present invention relates to methods of stabilizing and/or sealing core and stabilized and/or sealed core for manufacturing molded composite structures. In particular, the present invention relates to methods of stabilizing and/or sealing core and stabilized and/or sealed core for manufacturing aircraft. In one implementation, the core is stabilized or sealed by applying a layer of roll-coated adhesive on the core, applying a layer of stabilizing material on the roll-coated adhesive layer; and applying a layer of thermoplastic barrier film on the stabilizing material.

16 Claims, 15 Drawing Sheets

U.S. PATENT DOCUMENTS

| | | | | |
|---|---|---|---|---|
| 4,938,824 | A | 7/1990 | Youngkeit | |
| 4,956,217 | A * | 9/1990 | Heitkamp | 428/116 |
| 5,006,391 | A * | 4/1991 | Biersach | 428/116 |
| 5,022,952 | A | 6/1991 | Vaniglia | |
| 5,023,041 | A | 6/1991 | Jones et al. | |
| 5,059,377 | A | 10/1991 | Ashton et al. | |
| 5,106,668 | A * | 4/1992 | Turner et al. | 428/116 |
| 5,223,067 | A | 6/1993 | Hamamoto et al. | |
| 5,238,725 | A * | 8/1993 | Effing et al. | 428/116 |
| 5,242,523 | A | 9/1993 | Willden et al. | |
| 5,242,651 | A | 9/1993 | Brayden et al. | |
| 5,259,901 | A | 11/1993 | Davis et al. | |
| 5,262,121 | A | 11/1993 | Goodno | |
| 5,266,137 | A | 11/1993 | Hollingsworth | |
| 5,362,345 | A | 11/1994 | Stettler et al. | |
| 5,547,629 | A | 8/1996 | Diesen et al. | |
| 5,567,499 | A | 10/1996 | Cundiff et al. | |
| 5,571,357 | A | 11/1996 | Darrieux et al. | |
| 5,688,353 | A | 11/1997 | Dublinski et al. | |
| 5,746,553 | A * | 5/1998 | Engwall | 409/132 |
| 5,789,482 | A * | 8/1998 | Eldin et al. | 525/65 |
| 5,851,336 | A | 12/1998 | Cundiff et al. | |
| 5,897,739 | A | 4/1999 | Forster et al. | |
| 5,914,175 | A * | 6/1999 | Nudo et al. | 428/178 |
| 6,090,729 | A * | 7/2000 | Jonas | 442/180 |
| 6,096,164 | A | 8/2000 | Benson et al. | |
| 6,099,680 | A * | 8/2000 | Harris et al. | 156/279 |
| 6,179,945 | B1 | 1/2001 | Greenwood et al. | |
| 6,180,206 | B1 * | 1/2001 | Kain, Jr. | 428/116 |
| 6,306,942 | B1 * | 10/2001 | McCarthy et al. | 524/195 |
| 6,638,466 | B1 | 10/2003 | Abbott | |
| 6,679,969 | B1 | 1/2004 | Fournier et al. | |
| 6,692,681 | B1 | 2/2004 | Lunde | |
| 6,776,865 | B1 * | 8/2004 | Yamaguchi et al. | 156/245 |
| 6,823,578 | B2 | 11/2004 | Anderson et al. | |
| 2002/0009935 | A1 * | 1/2002 | Hsiao et al. | 442/149 |
| 2002/0069962 | A1 * | 6/2002 | Maxwell et al. | 156/286 |
| 2003/0052212 | A1 | 3/2003 | Anderson et al. | |
| 2004/0086686 | A1 * | 5/2004 | Holemans | 428/116 |
| 2006/0008611 | A1 * | 1/2006 | Shen et al. | 428/73 |
| 2006/0046019 | A1 * | 3/2006 | Wang et al. | 428/73 |

FOREIGN PATENT DOCUMENTS

| | | | |
|---|---|---|---|
| EP | 0 770 472 A | | 5/1997 |
| EP | 0 786 330 | * | 7/1997 |
| EP | 0 786 330 A | | 7/1997 |
| EP | 1 005 978 A | | 6/2000 |
| FR | 2 424 470 A | | 11/1979 |
| FR | 2 664 529 | | 7/1990 |
| GB | 1 481 167 | | 7/1977 |
| GB | 2 232 954 A | | 1/1991 |
| JP | 60-120045 | * | 6/1985 |
| JP | 4-179515 A | | 6/1992 |
| JP | 9-254284 | * | 9/1997 |
| WO | WO98/32589 | | 7/1998 |

OTHER PUBLICATIONS

J. Carre, International Search Report for International application No. PCT/US 02/05094, (Aug. 2, 2002).

D.V. Rosato et al., "Filament Winding: Its Development, Manufacture, Applications, and Design," John Wiley & Sons, Inc., (1964).

A. Van Wallene, International Search Report for International application No. PCT/US 01/45750 (Sep. 19, 2002).

"Filament Winding Composite Structure Fabrication," Society for the Advancement of Material and Process Engineering, 1991. (13 pages).

Marchel, Oliver, "Space Qualification Program for CFRP-Prepregs Used for Design of Deployable Booms as a Main Structural Part of a Solar Sail." (12 pages), 2000.

User Manual for Cadwind NG for Windows, 1999. (4 pages).

"The Mission: To Deliver Large-Tow Carbon Fiber in Filament Winding Applications." (21 pages), date unknown.

Entec Composite Machines Home Page, http://www.entec.com, Dec. 19, 2003. (2 pages).

McClean Anderson Home Page, http://www.mcleananderson.com, Dec. 19, 2003. (1 page).

Walsh, Paul et al., "Carbon Fiber Property Translation into Composite—A Comparison of Commercial Grade 48K Carbon Fibers Versus 12K Aerospace Fibers." (16 pages), 2000.

* cited by examiner

830

METHODS OF STABILIZING AND/OR SEALING CORE MATERIAL AND STABILIZED AND/OR SEALED CORE MATERIAL

I. CROSS-REFERENCE TO RELATED APPLICATION

This application claims the benefit of U.S. Provisional Application No. 60/511,321, filed Oct. 16, 2003, by Alan H. Anderson and titled METHODS OF STABILIZING AND/OR SEALING CORE MATERIAL AND STABILIZED AND/OR SEALED CORE MATERIAL, the disclosure of which is expressly incorporated herein by reference.

II. BACKGROUND

A. Technical Field

The present invention relates to methods of stabilizing and/or sealing the core of a molded composite structure and the stabilized and/or sealed core of such structures. In particular, the present invention relates to methods of manufacturing aircraft from such structure.

B. Technology Background

Presently, composite materials (such as fiber-reinforced plastics) are increasingly being used to manufacture aircraft. The manufacture of such aircraft with composite materials involves the fabrication of the major parts of the aircraft, including the fuselage, the wings, the empennage (tail), and the various other components of the aircraft. Typically, a layered stack of composite materials or a "material stack" is combined with a resin, placed on tooling, and cured to form a structure. In some cases, the material stack includes a central member called a core, which is intended to stiffen the material stack and thereby stiffen the structure created using that material stack. The core may include honeycomb structures, foam, or even wood. The core is referred to as a central member because, typically, the core is located between layers of composite materials. It should be understood, however, that core need not be located at the exact center of a material stack.

In one manufacturing method know as Resin Transfer Molding, or "RTM," a composite structure is fabricated by infusing resin into a closed mold into which a material stack has been placed, and then press curing the structure. An example of this type of manufacturing method is disclosed in U.S. Patent Application Publication No. 2002/0069962, published on Jun. 13, 2002, the disclosure of which is expressly incorporated herein. In another method, a material stack is placed on a mold having only one tool surface. A flexible membrane is then placed over the material stack and mold. Heat and pressure are then applied to the flexible membrane to consolidate and cure the material stack.

The use of core in these manufacturing methods, however, can create several problems. For example, in the RTM process, the injection of resin into the tooling may cause resin to infiltrate into either the cells of the core in honeycomb core, into the open spaces among the small foam cells in closed cell foam core, or into the foam cells themselves in open cell foam core. This results in undesirable weight gain. Therefore, in order to prevent this weight gain, the core is often sealed to prevent the infiltration of resin.

In addition, in the case of honeycomb core, the pressure exerted on the core by the injection of resin or by the use of an autoclave to apply pressure and heat may cause the cells in the core to distort or collapse. This can also result in deformation of the composite structure as a whole. Therefore, in order to prevent this deformation, the honeycomb core often needs to be stabilized.

Typically, a core is sealed using barriers on the outer surfaces of the core. The barriers prevent the intrusion of resin into the core. The barriers are usually constructed of bondable thermoplastic films. Further, in order to stabilize the core in the direction perpendicular to its thickness, a support layer is often placed on the surfaces of the core. The support layer is typically a fibrous material (such as glass, carbon or an organic compound) in woven cloth, chopped, or random strand mat form impregnated with epoxy resins. Both a stabilization layer and a barrier are usually necessary because the stabilization layer is typically porous and will not prevent the intrusion of resin into the core.

Presently, film adhesives are used to bond the support layer to the core and to the barrier. Film adhesives are normally comprised of epoxy resin materials in the form of a thin film, such as NB101A manufactured by Newport Adhesives and Composites of Irvine, Calif. After application of the support layer, the core is subjected to heat to cure the film adhesive, which then bonds the support layer to the core and barrier, thereby, sealing and stabilizing the core.

These methods of sealing and stabilization, however, have certain drawbacks. For example, the film adhesives used in the present method are expensive and may be twice as heavy as needed to perform the required function. For some thin core applications, this added weight approximately doubles the area density of the core and may triple the cost of the core structure. In addition, the stabilizing material is not generally relied on structurally, i.e., not counted upon for load carrying. Finally, this method relies on labor to prepare the surface of the sealed and stabilized core for subsequent bonding. Thus, there is a need for a method of stabilizing and/or sealing a core material without these deficiencies.

Apparatus and methods consistent with the invention provide for a method of stabilizing and/or sealing a core material without adding considerable cost and weight to the structure.

III. SUMMARY OF THE INVENTION

Apparatus and methods consistent with the invention may provide a method of stabilizing a core to be used in a composite structure comprising applying a thermoplastic barrier film to stabilizing material; rolling a layer of roll-coated adhesive on a surface of the core to form a roll-coated adhesive layer on the core; applying the thermoplastic barrier film and stabilizing material on the core such that the roll-coated adhesive layer is against the stabilizing material; and curing the stabilizing material to form a core with a stabilized surface.

Apparatus and methods consistent with the invention may also provide a method of stabilizing a core to be used in a composite structure comprising applying a thermoplastic barrier film to stabilizing material; rolling a layer of roll-coated adhesive on a surface of the core using a powered paint roller to form a roll-coated adhesive layer on the core; applying the thermoplastic barrier film and stabilizing material on the core such that the roll-coated adhesive layer is against the stabilizing material; placing the core with the applied thermoplastic barrier film and stabilizing material in a heated platen press; and curing the stabilizing material with the heated plated press to form a core with a stabilized surface.

Apparatus and methods consistent with the invention may further provide a method of stabilizing a core to be used in a composite structure comprising applying a thermoplastic barrier film to stabilizing material; rolling a layer of roll-coated adhesive on a surface of the core to form a roll-coated adhesive layer on the core; applying the thermoplastic barrier film and stabilizing material on the core such that the roll-coated adhesive layer is against the stabilizing material; placing the core with the applied thermoplastic barrier film and stabilizing material in tooling; placing a flexible membrane over the core with the applied thermoplastic barrier film and stabilizing material; and applying heat and pressure to the core with the applied thermoplastic barrier film and stabilizing material to cure the stabilizing material.

Apparatus and methods consistent with the invention may also provide a method of stabilizing and sealing a core to be used in a composite structure comprising: applying a first thermoplastic barrier film to a first stabilizing material; rolling a first layer of roll-coated adhesive on a surface of the core to form a first roll-coated adhesive layer on the core; applying the first thermoplastic barrier film and first stabilizing material on the core such that the first roll-coated adhesive layer is against the first stabilizing material; curing the first stabilizing material to form a core with a stabilized surface; machining the core to a desired shape; applying a second thermoplastic barrier film to a second stabilizing material; rolling a second layer of roll-coated adhesive on all unstabilized surfaces of the core to form a second roll-coated adhesive layer on the unstabilized surfaces of the core; applying the second thermoplastic barrier film and second stabilizing material on the core such that the second roll-coated adhesive layer is against the second stabilizing material; and curing the second stabilizing material to form a stabilized and sealed core.

Apparatus and methods consistent with the invention may further provide a method of stabilizing and sealing a core to be used in a composite structure comprising: applying a first thermoplastic barrier film to a first stabilizing material; rolling a first layer of roll-coated adhesive on a top surface of the core and a bottom surface opposing that top surface to form a first roll-coated adhesive layer on the core; applying the first thermoplastic barrier film and first stabilizing material on the core such that the first roll-coated adhesive layer is against the first stabilizing material and the first thermoplastic barrier film covers the top and bottom surfaces of the core; curing the first stabilizing material to form a core with stabilized top and bottom surfaces; machining the core to a desired shape; applying a second thermoplastic barrier film to a second stabilizing material; rolling a second layer of roll-coated adhesive on all machined surfaces of the core to form a second roll-coated adhesive layer on the machined surfaces of the core; applying the second thermoplastic barrier film and second stabilizing material on the core such that the second roll-coated adhesive layer is against the second stabilizing material and the thermoplastic barrier film covers the machined surfaces of the core; and curing the second stabilizing material to form a stabilized and sealed core.

Apparatus and methods consistent with the invention may further provide a method of stabilizing and sealing a core to be used in a composite structure comprising: machining the core to a desired shape; applying a thermoplastic barrier film to a stabilizing material; rolling a layer of roll-coated adhesive on all surfaces of the core to form a roll-coated adhesive layer on the core; applying the thermoplastic barrier film and stabilizing material on the core such that the roll-coated adhesive layer is against the stabilizing material and the thermoplastic barrier film covers all surfaces of the core; and curing the stabilizing material to form a stabilized and sealed core.

Apparatus and methods consistent with the invention may also provide a stabilized core for a composite structure. The core includes a layer of roll-coated adhesive on the surface of the core; a layer of stabilizing material on the roll-coated adhesive layer; and a layer of thermoplastic barrier film on the stabilizing material.

Apparatus and methods consistent with the invention may also provide a stabilized and sealed core for a composite structure. The core includes a layer of roll-coated adhesive on all surfaces of the core; a layer of stabilizing material on the roll-coated adhesive layer; and a layer of thermoplastic barrier film on the stabilizing material and covering all surfaces of the core.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

Figure 3:
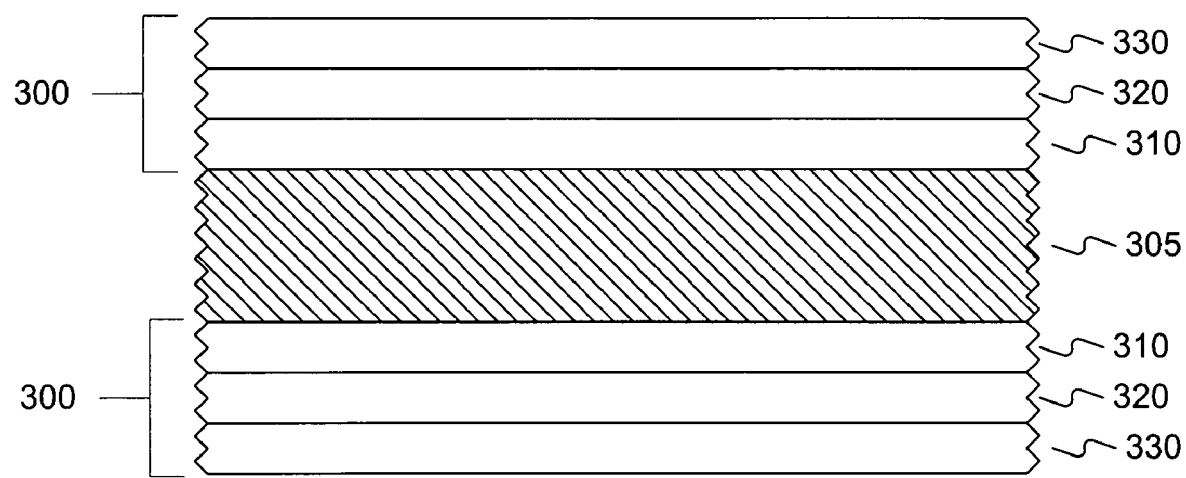
Figure 4:
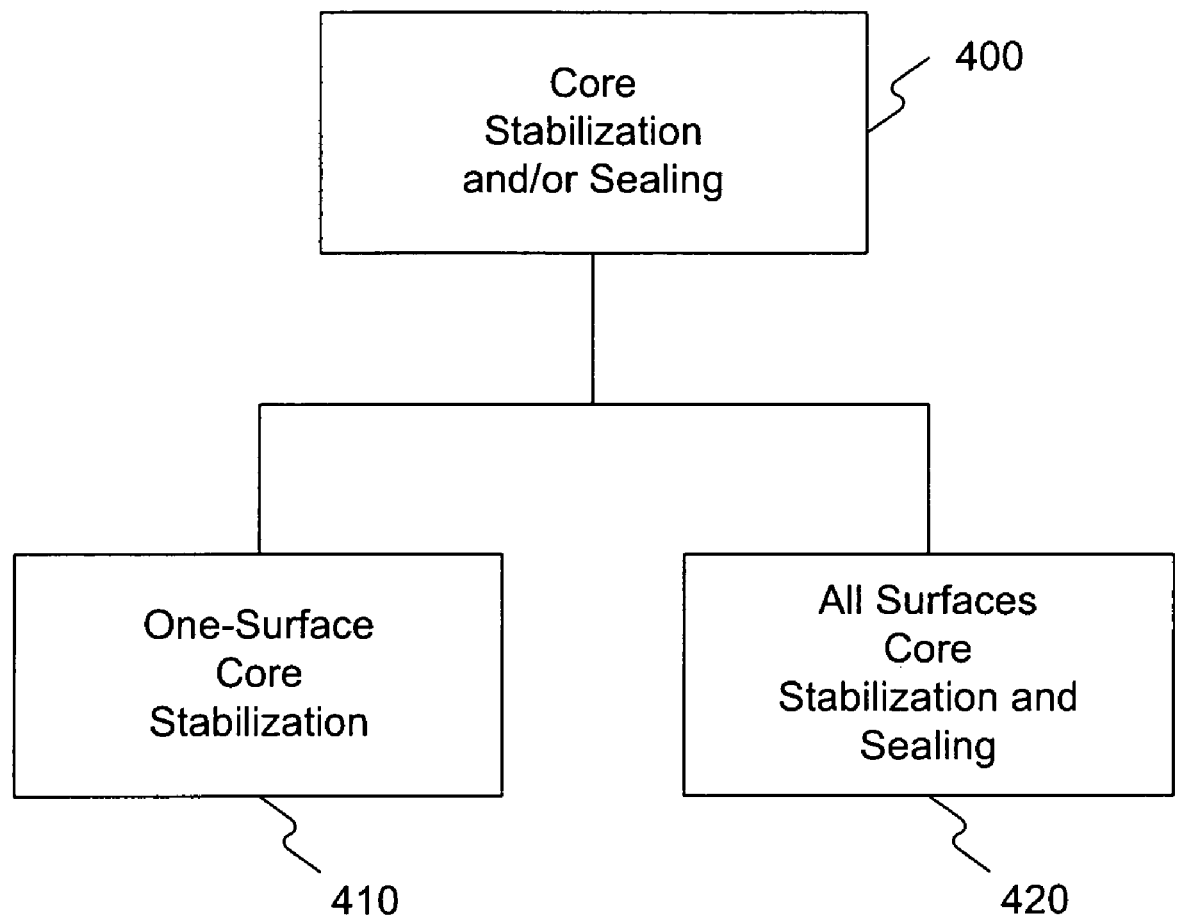
Figure 5A:
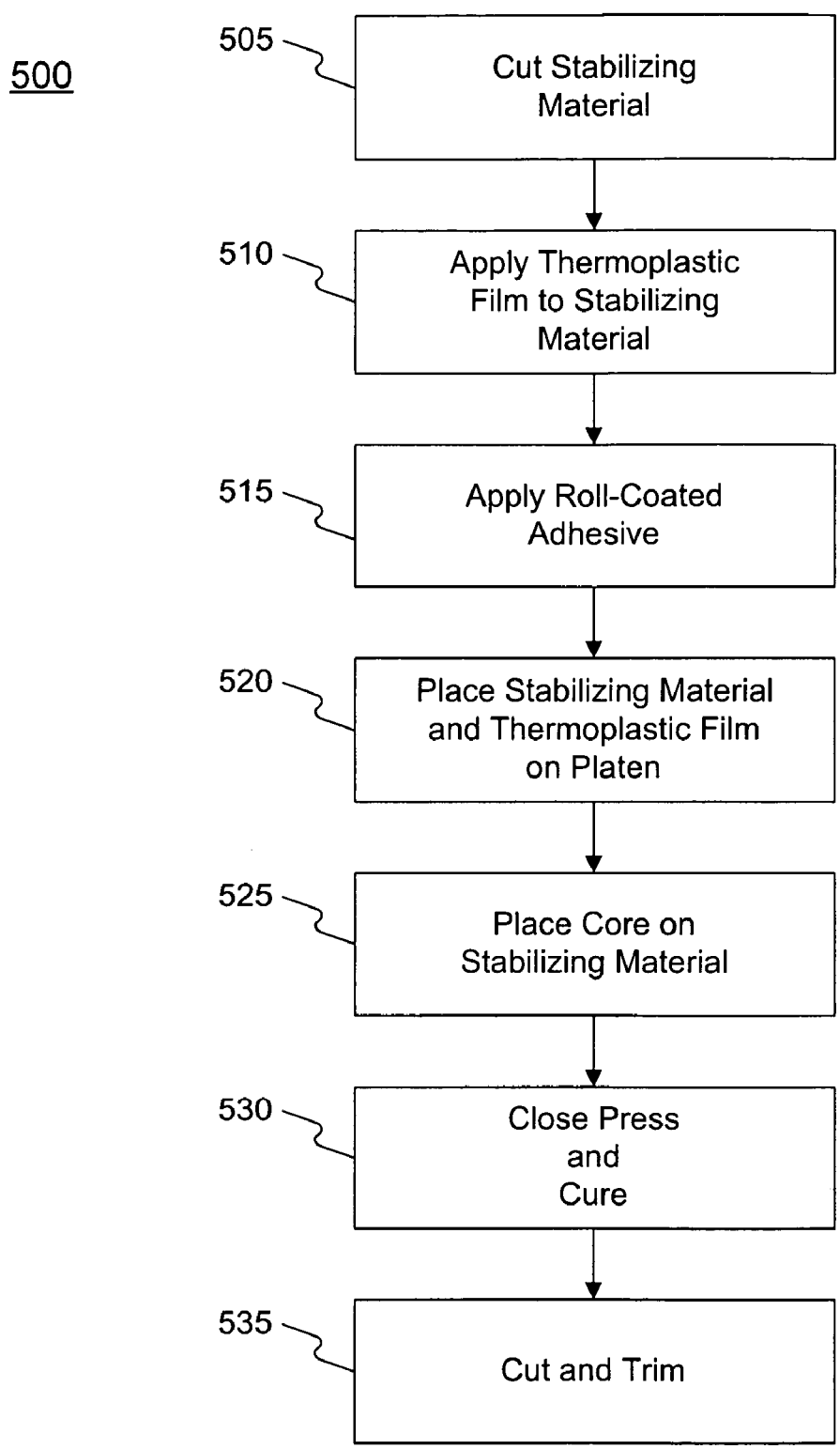
Figure 5B:
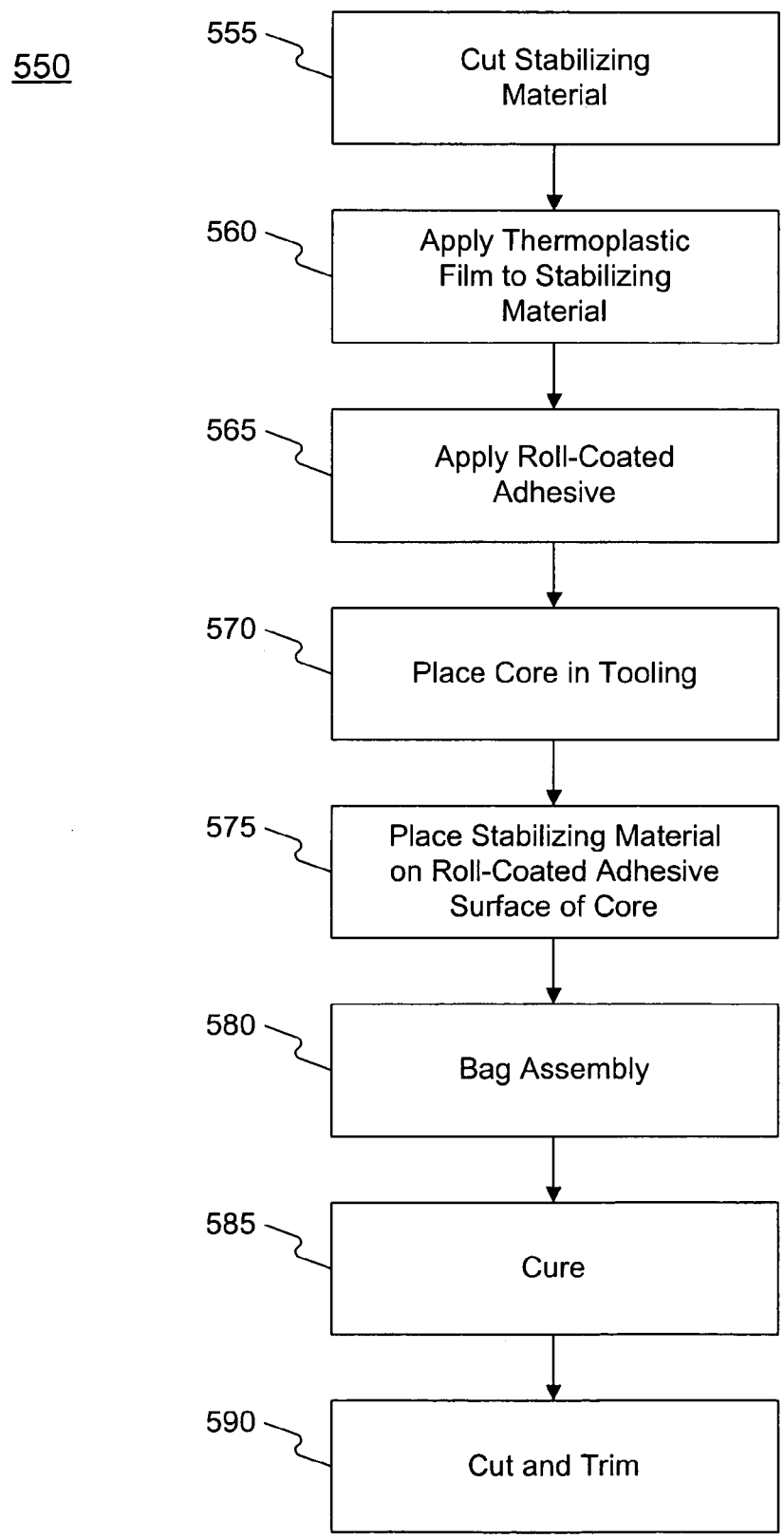
Figure 6:
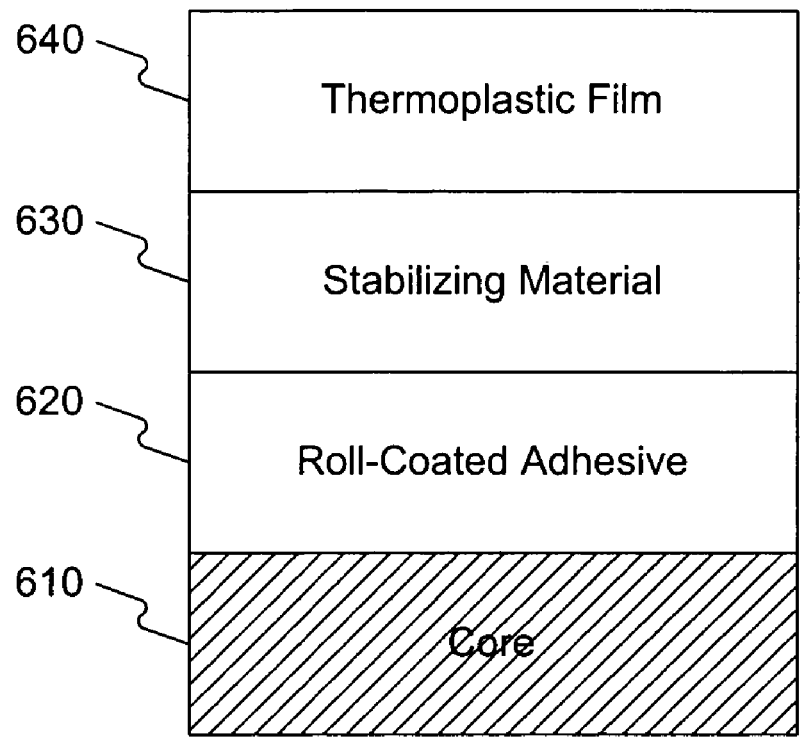
Figure 7:
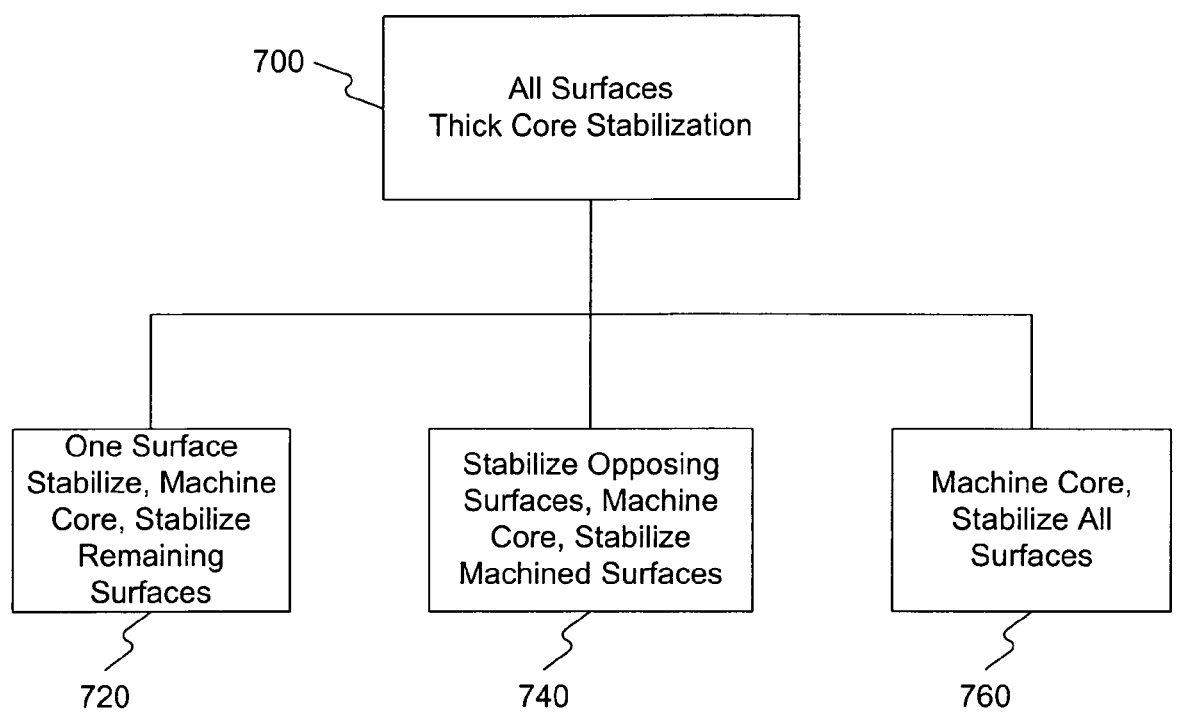
Figure 8A:
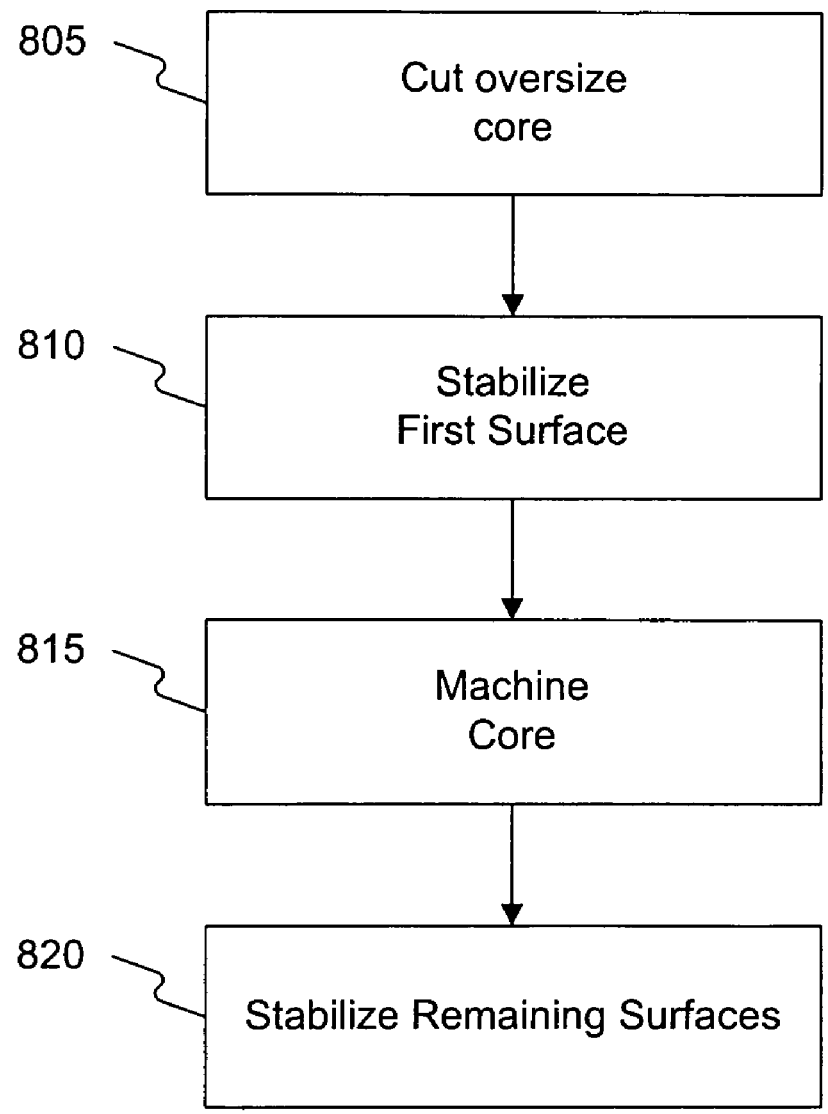
Figure 8B:
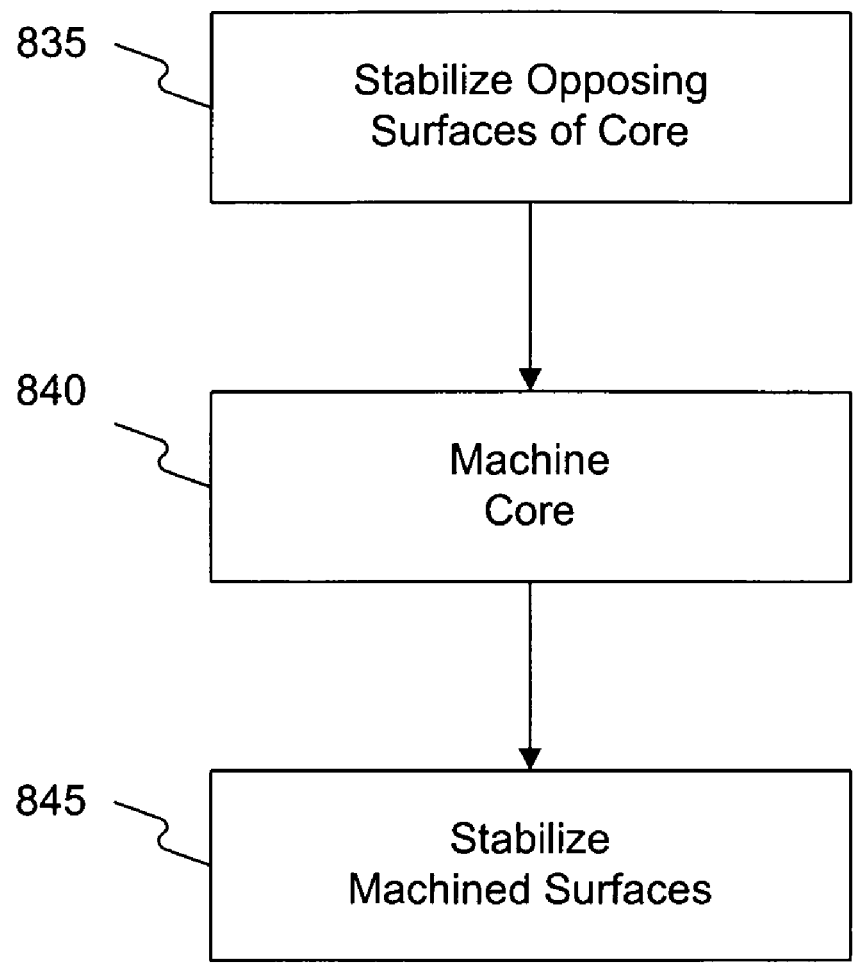
Figure 8C:
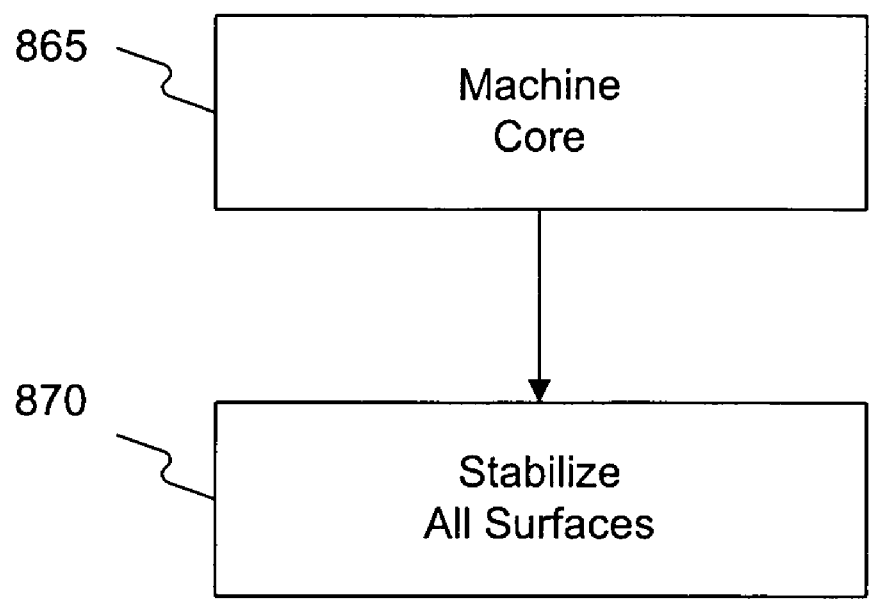
Figure 9:
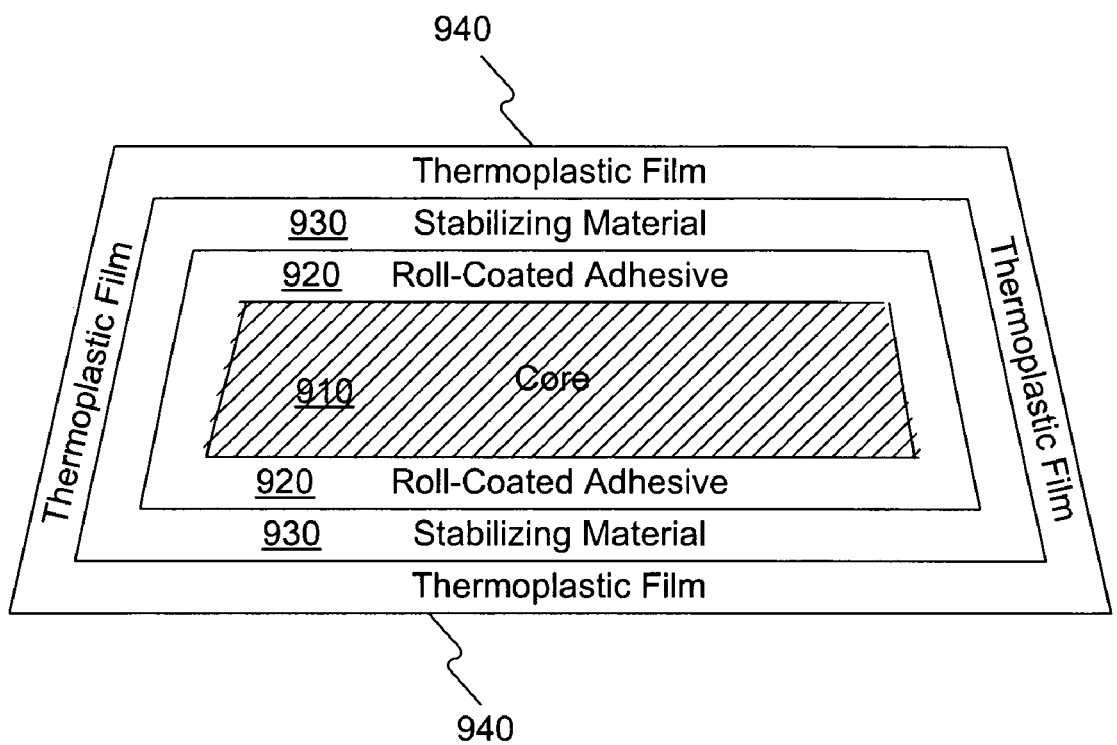
Figure 10:
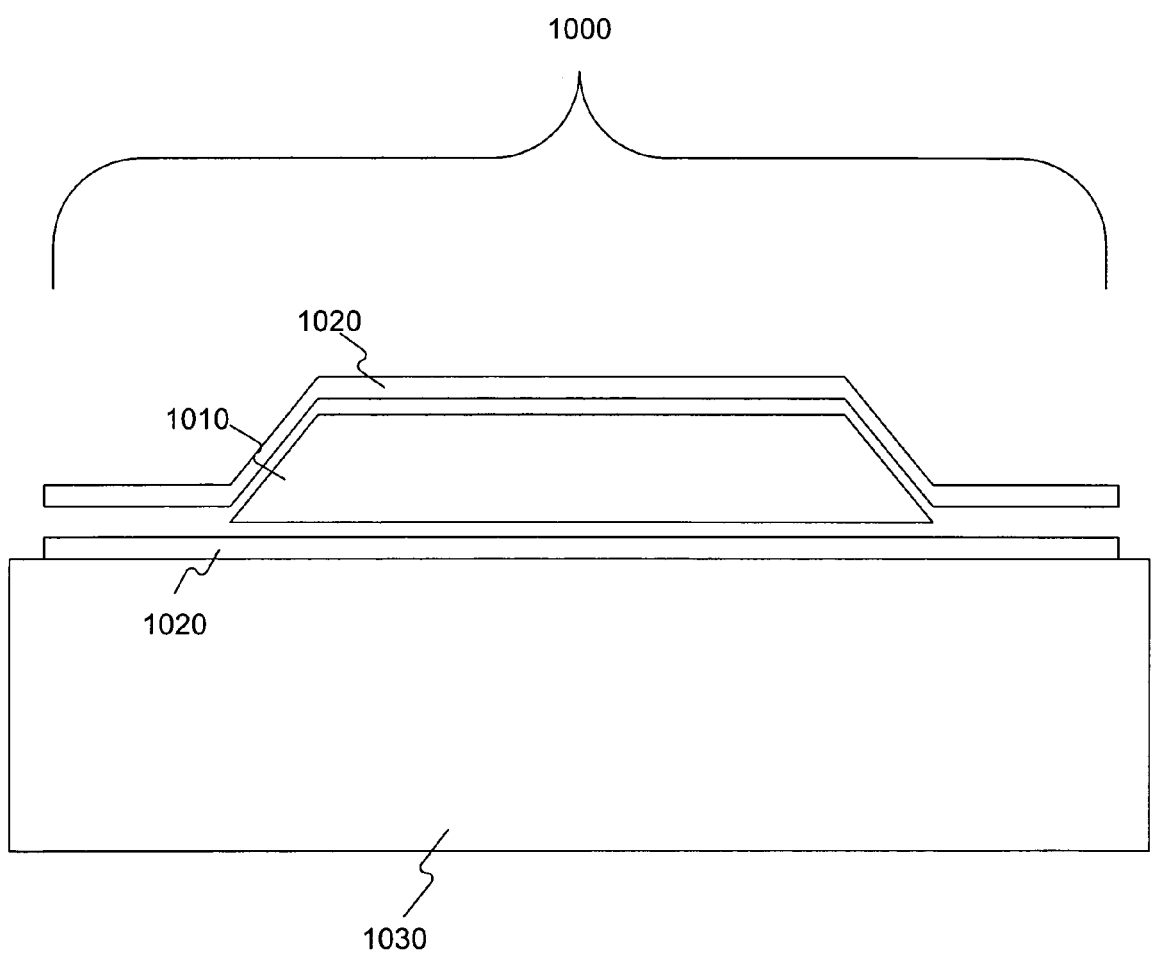
Figure 11:
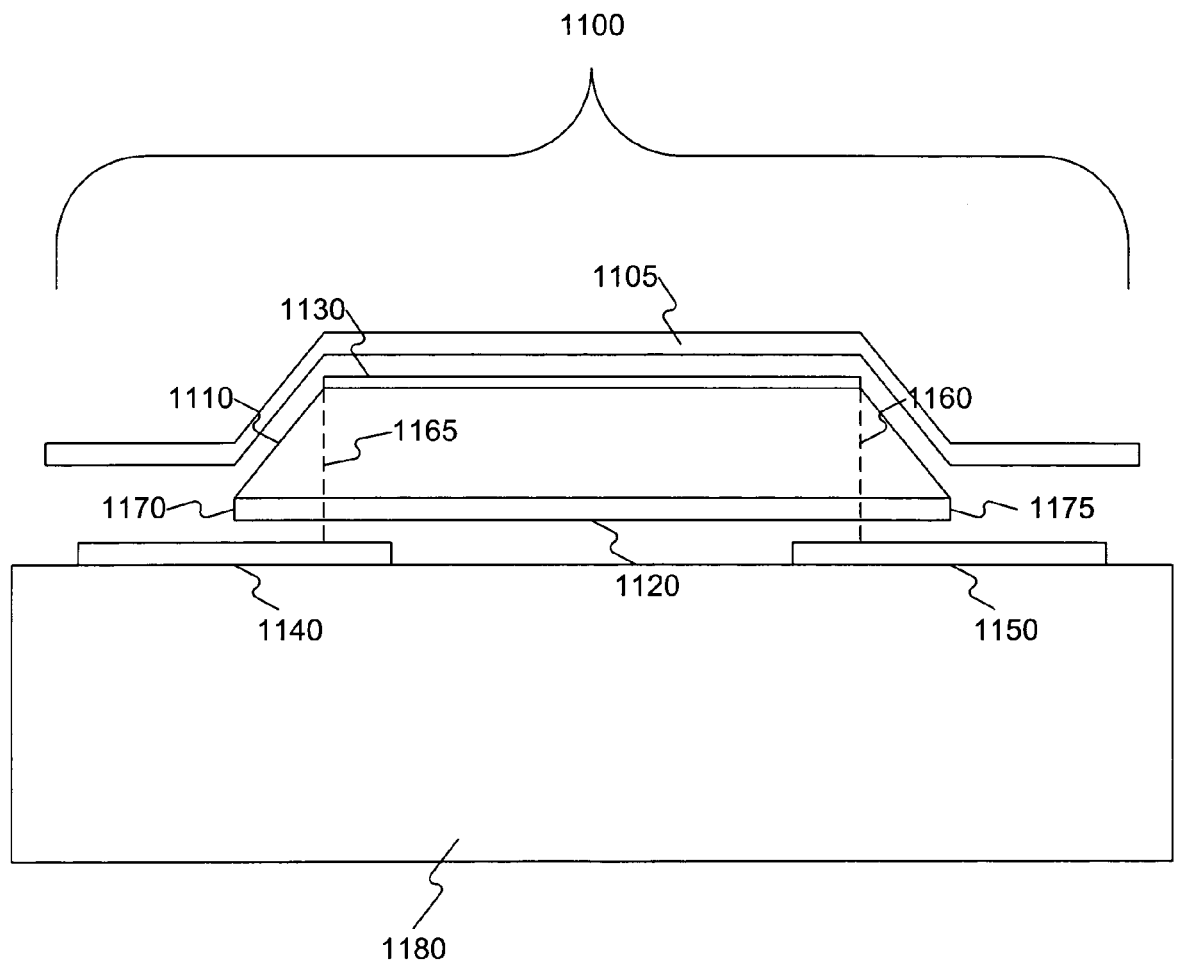
Figure 12:
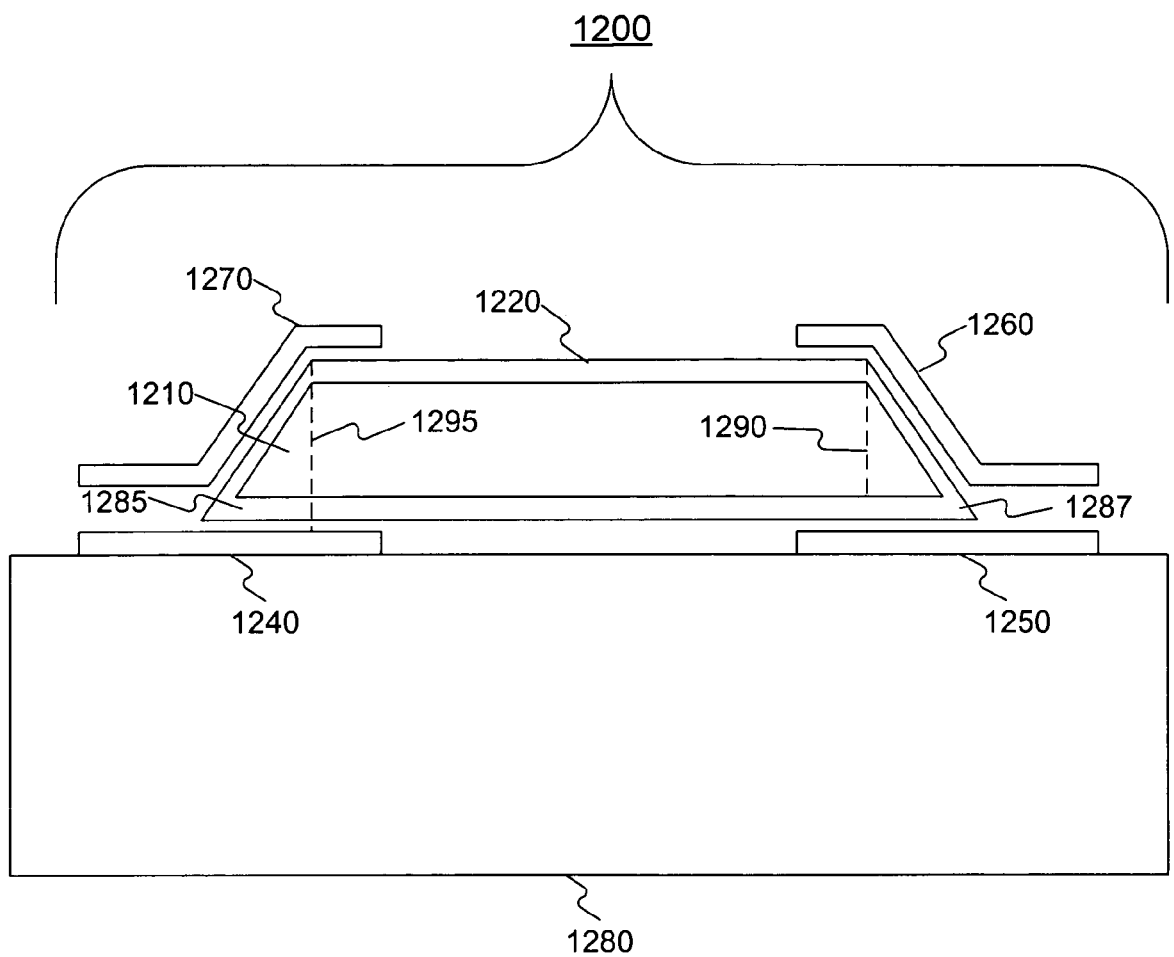

FIG. 3 schematically illustrates stabilization and sealing materials for stabilizing and sealing core consistent with an embodiment of the invention;

FIG. 4 is a diagram illustrating methods of stabilizing and/or sealing core consistent with an embodiment of the present invention, as shown in FIG. 3;

FIG. 5A is a flow diagram illustrating one surface core stabilization consistent with an embodiment of the present invention, as shown in FIG. 4;

FIG. 5B is a flow diagram illustrating one surface core stabilization consistent with another embodiment of the present invention, as shown in FIG. 4;

FIG. 6 schematically illustrates a core with one surface stabilized consistent with an embodiment of the invention;

FIG. 7 is a diagram illustrating methods of stabilizing and sealing all surfaces of a core consistent with an embodiment of the present invention;

FIG. 8A is a flow diagram illustrating all surfaces core stabilization and sealing consistent with an embodiment of the present invention;

FIG. 8B is a flow diagram illustrating all surfaces core stabilization and sealing consistent with another embodiment of the present invention;

FIG. 8C is a flow diagram illustrating all surfaces core stabilization and sealing consistent with another embodiment of the present invention;

FIG. 9 illustrates an all surfaces stabilized and sealed core consistent with an embodiment of the invention;

FIG. 10 schematically illustrates composite part layup using a core with at least one surface stabilized consistent with an embodiment of the invention;

FIG. 11 schematically illustrates composite part layup using a core with one surface stabilized consistent with an embodiment of the invention; and FIG. 12 illustrates composite part layup using a core with all surfaces stabilized and sealed consistent with an embodiment of the invention.

V. DESCRIPTION OF THE EMBODIMENTS

A. Introduction

Methods and structures consistent with the present invention are described herein with respect to a method of stabilizing and/or sealing core material and stabilized and/or sealed core material for manufacturing aircraft or aircraft structures and components thereof, such as, wing structures, inserts, control surfaces, empennage, fuselage, and stabilizers. In addition, the invention as claimed, is broader than aircraft structures and extends to all applications where strong light-weight panels are useful. Such applications include vehicles such as automobiles, trucks, recreational vehicles, watercraft, and building and structural materials. The following examples are just some of the embodiments and implementations consistent with the invention. Other embodiments and other implementations may also be used.

Figure 1:
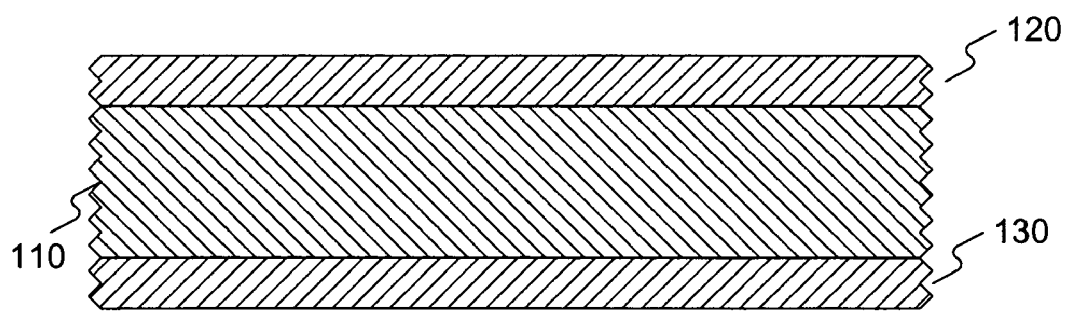
FIG. 1 is a schematic depiction of a material stack used to create a molded composite structure.
Figure 2:
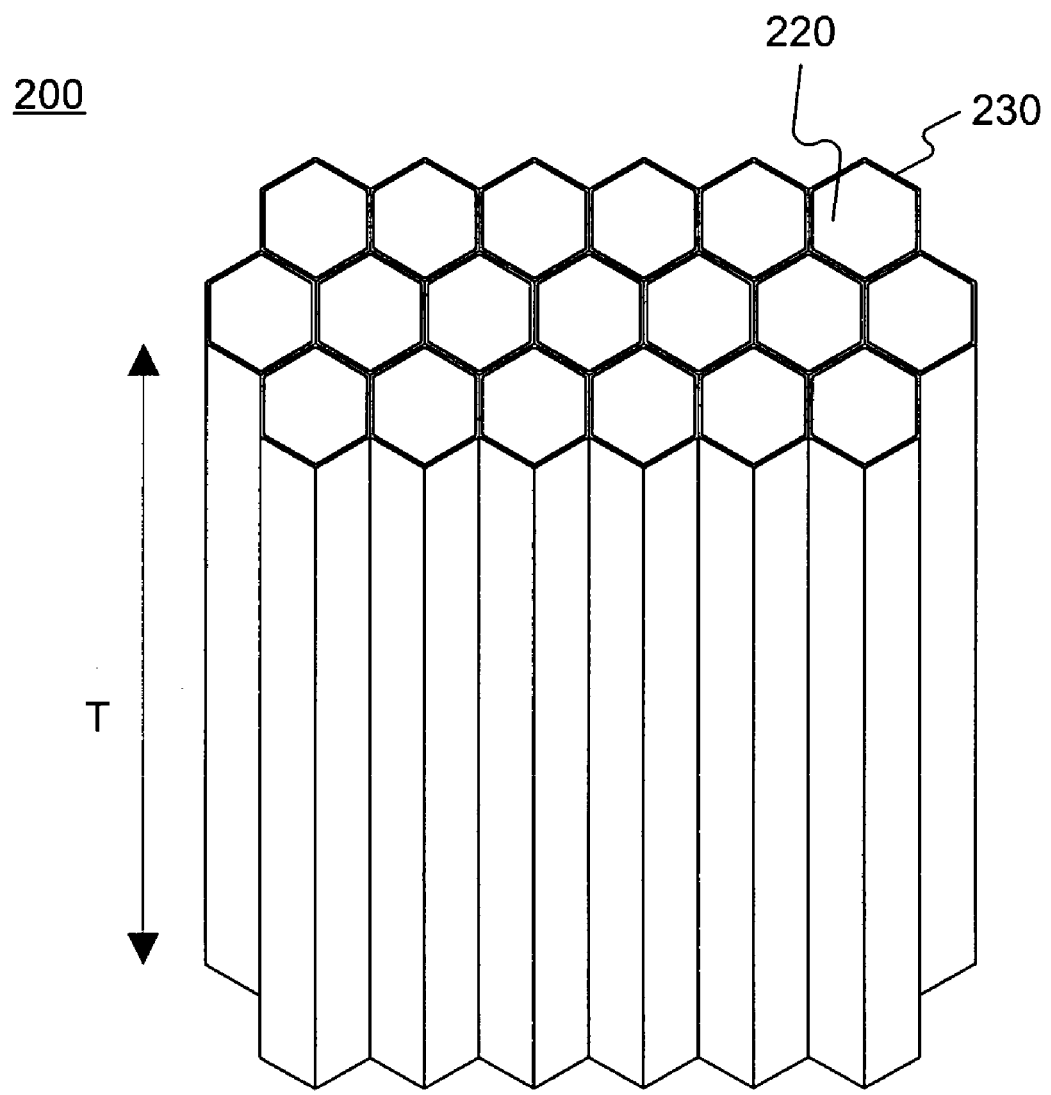
FIG. 2 is a schematic depiction of a honeycomb core.

FIGS. 1-3 depict the materials used to stabilize and seal core material for manufacturing composite structures. FIGS. 4-9 then depict methods of stabilizing and/or sealing core material using these materials. Finally, FIGS. 10-12 depict the manufacture of composite structures using a stabilized and/or sealed core.

B. Methods and Structures

FIG. 1 is a schematic depiction of a material stack used to create a molded composite structure. As shown in FIG. 1, in one implementation, material stack 100 includes a core 110, upper skin 120, and lower skin 130. Upper skin 120 and lower skin 120 are composite materials used to create a molded composite structure. As described above, core 110 is a material used to stiffen the material stack and the resulting molded composite structure. Honeycomb material can be used as the core and may be made from metal foils or plastic materials along with natural or synthetic fibers formed into paper. Honeycomb core materials may also be formed from thin sheets of aluminum alloys, stainless steel, or titanium alloys, or from non-metallic materials, such as aramid fibers embedded in phenolic resin to form a paper, and then shaped into a honeycomb cell structure. The core may also be polymer foam, either with closed or open cells. Foam core may be made from rigid thermoplastics or thermosetting polymers that have been foamed. Core 110 may also include a combination of honeycomb and foam, as for example, when the cells of a honeycomb are filled with polymer foam. These implementations are merely exemplary, and other implementations may also be used.

FIG. 2 is a schematic depiction of a honeycomb core. As shown in FIG. 2, honeycomb structures 200 have a repetitive array of open cells 220 that are generally perpendicular to the thickness of the honeycomb (T in FIG. 2) and connected end walls 230. Such structures show exceptional rigidity in the thickness direction. This implementation is merely exemplary, and other implementations may also be used.

FIG. 3 schematically illustrates stabilization and sealing materials for stabilizing and sealing core consistent with an embodiment of the invention. The thickness of the layers is schematic and actual layer thicknesses are not being depicted. As shown in FIG. 3, in one implementation, stabilization and sealing materials 300 include roll-coated adhesive 310, stabilizing material 320, and thermoplastic film 330. Stabilization material 320 stabilizes core 305 in the direction perpendicular to the thickness of core and is further described below. Thermoplastic film 330 prevents resin from intruding into core 305, during manufacture of a composite structure and is further described below. Core 305 may be constructed of any of the core materials described previously.

Roll-coated adhesive 310 is used to bond stabilizing material 320 to core 305. Roll-coated adhesive 310 is an adhesive having sufficient viscosity such that it is capable of being applied to core 305 by means of a roller without significantly infiltrating core 305 (i.e., the adhesive substantially remains on the surface of core 305). Roll coated adhesives of this type are commonly referred to as "hot melts" and generally have a viscosity of approximately 30,000 centipoises. In one implementation, roll-coated adhesive 310 may be a liquid epoxy resin. In another implementation, this liquid epoxy resin may be applied at room temperature. In yet another implementation, roll-coated adhesive 310 may be the same epoxy resin used in the RTM process to create the composite structure as described above. In still another implementation, chemicals may be added to the roll-coated adhesive to make the adhesive more viscous, to improve adherence during roll coating and, in the case of honeycomb core such as honeycomb core 200 in FIG. 2, to improve the adherence between the core cell wall and stabilization material during cure. In one implementation a chemical such as carboxy-terminated butadiene nitrile (CTBN) rubber, DuoMod DP5047 or DP5045 from Zeon Chemicals L.P. of Louisville, Ky., particles of polyetherimide (PEI), particles of polyethersulfone (PES), or particles of polyetheretherketone (PEEK) may be used. Such chemicals are often referred to as "tougheners." These implementations are merely exemplary, and other implementations may also be used.

Stabilizing material 320 is used to stabilize and reinforce core 305. Stabilizing material 320 is a composite material that when adhered to core 305, stabilizes core 305 in the direction perpendicular to the thickness of core 305. In one implementation, stabilizing material 320 may be a layer of composite material, such as woven or random mat, impregnated with resin, such as an epoxy resin. In another implementation, the stabilizing material is impregnated with epoxy resin containing a small amount of a curing agent, such as diethylenetriamine (DETA), an aliphatic polyamine, which is reactive with thermoplastic film 330 and insures a cross-linking bond between the thermoplastic film 330 and stabilizing material 320. In another implementation, stabilizing material is a carbon fiber impregnated with an epoxy resin formulated for toughness and wound so that no gaps exist between adjacent bands of fiber. In yet another implementation, the stabilizing material is a layer of composite material wound at a thickness and orientation such that when a stabilized core is used to manufacture a composite structure, stabilizing material 320 may replace a layer of composite material in the area of the core. These implementations are merely exemplary, and other implementations may also be used.

Thermoplastic film 330 is used to seal core 305. Thermoplastic film 330 bonds to the stabilizing material 320 to seal the core. In one implementation, thermoplastic film 330 also bonds to a composite skin material laid over it during manufacture of a composite structure. In one implementation, thermoplastic film 330 may be a polyetherimide (PEI) thermoplastic film sold under the trade name ULTEM and available from General Electric Plastics of Pittsfield, Mass. In another implementation, the ULTEM may be 0.001 or 0.002 inches thick. In yet another implementation, thermoplastic film 330 may be a polyvinyl fluoride (PVF) film sold under the Dupont trade name Tedlar. These implementations are merely exemplary, and other implementations may also be used.

FIG. 4 is a diagram illustrating methods of stabilizing and/or sealing core consistent with an embodiment of the present invention, as shown in FIG. 3. As shown in FIG. 4, in one implementation, core stabilization and/or sealing 400 may be achieved using one of two methods: one surface core stabilization 410 and all surfaces core stabilization and sealing 420. This implementation is merely exemplary, and other implementations may also be used.

One surface core stabilization 410 comprises the stabilization of one surface of a core using the sealing and stabilizing materials discussed above. One surface core stabilization 410 is depicted in FIGS. 5A-6. All surfaces core stabilization and sealing 420 comprises the stabilization and sealing of all surfaces of a core using the sealing and stabilizing materials discussed above. All surfaces core stabilization and sealing 420 is depicted in FIGS. 7-9. These implementations are merely exemplary, and other implementations may be used.

The choice of which of these methods to use will depend on the intended use and type of core. In one implementation, if a sealed and stabilized core is required, then all surfaces core stabilization and sealing 420 may be used. In another implementation, if only a stabilized core is required, either all surfaces core stabilization and sealing 420 or one sized core stabilization 410 may be used. In yet another implementation, if only a stabilized core is required, all surfaces core stabilization and sealing 420 may be used for all thick core pieces, and one sized core stabilization 410 may be used for all thin core pieces. In this implementation, thick core may be defined as core more than 0.750 inches thick and thin core may be defined as core less than 0.750 inches thick. These implementations are merely exemplary, and other implementations may also be used.

FIG. 5A is a flow diagram illustrating one surface core stabilization consistent with an embodiment of the present invention, as shown in FIG. 4. As shown in FIG. 5A, in one implementation, one surface core stabilization is achieved by a stabilization process 500. Stabilization process 500 comprises cut stabilizing material 505, apply thermoplastic film to stabilizing material 510, apply roll-coated adhesive 515, place stabilizing material and thermoplastic film in platen 520, place core on stabilizing material 525, close press and cure 530, and cut and trim 535. With respect to the description below of stabilization process 500, it should be understood that the terms "core," "roll-coated adhesive," "thermoplastic film," and "stabilizing material" refer to those materials described above (for example, core 305, roll-coated adhesive 310, stabilizing material 320, and thermoplastic film 330 of FIG. 3).

In this implementation, stabilization process 500 begins with cutting a stabilizing material to the size of the core to be stabilized (Block 505). As described above, the stabilizing material will stabilize the core in the direction perpendicular to its thickness.

In this implementation, the next step is applying a thermoplastic film, such as those described above, to the stabilizing material (Block 510). As described above, the thermoplastic film, once applied, will act as a barrier on the core. In one implementation, the thermoplastic film may be applied by manually unrolling the film directly onto the stabilizing material, by use of a mechanical spreader that pays out the film as the mechanism passes over the stabilizing material, or by automated placement using a numerically controlled film laying machine. These implementations are merely exemplary, and other implementations may also be used.

In this implementation, the step of applying a thermoplastic film to the stabilizing material is followed by applying a roll-coated adhesive to the surface of the core to be stabilized (Block 515). In one implementation, this is accomplished using a powered paint roller such as those used to apply paint to large flat surfaces. In this implementation, the adhesive is heated and pumped into a heated roller from a pressure pot where it then passes out through holes in the roller core to the matted surface of the roller where it is roll applied onto the surface of the core. The operator of the roller judges the amount applied based upon a visual standard or the core can be weighed to determined correct application quantity and visually judged for evenness of application. It should be appreciated that roll-coated adhesives are significantly less expensive and will weigh significantly less than the film adhesives used in the prior art. Therefore, the use of a roll-coated adhesive results in a substantial cost and weight benefit These implementations are merely exemplary, and other implementations may also be used.

In this implementation, the next step is placing the now joined stabilizing material and thermoplastic film on a platen in a heated platen press (Block 520). In one implementation, the joined stabilizing material and thermoplastic film is placed in the press with the thermoplastic film against the upper surface of the lower platen. The press may have a single opening, upon which the stabilizing material and thermoplastic film is placed, or may have multiple openings with multiple platens upon which stabilizing material and thermoplastic film may be placed. Presses of this type are typically used to cure sandwich floor panel stock for commercial aircraft or slab type hollow core doors for homes.

In this implementation, placing the joined stabilizing material and thermoplastic film on a platen is followed by placing the core on the stabilizing material in the platen press (Block 525). In this implementation, the surface of the core with adhesive is placed against the stabilizing material.

In this implementation, the next step is closing the press with the core and stabilizing materials inside and applying pressure and heat to cure the stabilizing materials onto the surface of the core (Block 530). In one implementation, the heat to be used is expected to be the same necessary to subsequently cure the composite part into which the core will be used and the pressure used is 5 to 60 psi depending upon the strength and type of core. This implementation is merely exemplary, and other implementations may also be used.

In this implementation, the final step is cutting, trimming, and chamfering the stabilized core to the desired detailed configuration (Block 535). In one implementation, cutting and trimming may be performed using customary methods, that is, a hand held utility knife to trim the periphery and then sandpaper to create the chamfer, or a bandsaw to trim the periphery and then to cut the chamfer, or a numerically controlled router with a rotating blade to trim and chamfer the core in one operation. The stabilization is useful during machining as a vacuum can be applied to the stabilization to hold the core for precise machining.

The stages in FIG. 5A are merely exemplary, and other stages and other implementations may also be used.

FIG. 5B is a flow diagram illustrating one surface core stabilization consistent with another embodiment of the present invention, as shown in FIG. 4. As shown in FIG. 5B, in one implementation, one surface core stabilization is achieved by a stabilization process 550. Stabilization process 550 comprises cut stabilizing material 555, apply thermoplastic film to stabilizing material 560, apply roll-coated adhesive 565, place core in tooling 570, place stabilizing material on roll-coated adhesive side of core 575, bag assembly 580, cure 585, and cut and trim 590. With respect to the description below of stabilization process 550, it should be understood that the "core," "roll-coated adhesive," "thermoplastic film," and "stabilizing material" refer to those materials described above (for example, core 305, roll-coated adhesive 310, stabilizing material 320, and thermoplastic film 330 of FIG. 3).

In this implementation, stabilization process 550 begins with cutting a stabilizing material to the size of the core to be stabilized (Block 555). As described above, the stabilizing material will stabilize the core in the direction perpendicular to its thickness.

In this implementation, the next step is applying a thermoplastic film, such as those described above, to the stabilizing material (Block 560). As described above, the thermoplastic film, once applied, will act as a barrier on the core. In one implementation, the thermoplastic film may be applied by manually unrolling the film directly onto the stabilizing material, by use of a mechanical spreader that pays out the film as the mechanism passes over the stabilizing material, or by automated placement using a numerically controlled film laying machine. These implementations are merely exemplary, and other implementations may also be used.

In this implementation, the step of applying a thermoplastic film to the stabilizing material is followed by applying a roll-coated adhesive to the surface of the core to be stabilized (Block 565). In one implementation, this is accomplished using a powered paint roller such as those used to apply paint to large flat surfaces. In this implementation, the adhesive is heated and pumped into a heated roller from a pressure pot where it then passes out through holes in the roller core to the matted surface of the roller where it is roll applied onto the surface of the core. The operator of the roller judges the amount applied based upon a visual standard or the core can be weighed to determined correct application quantity and visually judged for evenness of application. These implementations are merely exemplary, and other implementations may also be used.

In this implementation, the next step is placing the core in a tooling (or mold) having the desired shape of the stabilized and sealed core such that the core surface which has been roll-coated with adhesive is away from the surface of the tool (Block 570). This implementation is merely exemplary, and other implementations may also be used. In this implementation, the step of placing the core in the tooling is followed by placing the joined stabilizing material and thermoplastic film on the roll-coated adhesive surface of core (Block 575).

In this implementation, the next step is placing a flexible membrane over the core, stabilizing material, and thermoplastic film and sealing it to the tooling with a sealing material (Block 580). In this implementation, the tooling surface upon which the core is placed is impervious to air ingress (air tight) such that when the flexible membrane is sealed over the core, stabilizing material, and thermoplastic film, a closed (air tight) space is formed. In one implementation, the flexible membrane may be a 0.001 to 0.003-inch thick plastic film or a 0.015 to 0.250-inch thick elastomeric sheet. In another implementation, the sealing material may be customary bag sealant such as those available from General Sealants, Inc. of City of Industry, Calif. or Schnee-Morehead of Irving, Tex. or a less conventional molded elastomeric shape supplied by Bondline Products of Norwalk, Calif. or D-Aircraft Products Inc. of California. In another implementation, prior to placing the flexible membrane over the core, stabilizing material, and thermoplastic film, tooling bars or fairing bars that match the height of the core are anchored to the mold and are placed around the perimeter of the core to keep the edges of the core from collapsing during the cure process. These implementations are merely exemplary, and other implementations may also be used.

In this implementation, the next step is placing the assembly in an oven or autoclave and applying heat and pressure to polymerize the roll-coated adhesive (Block 585). For oven cure, in one implementation, pressure is applied by removing the air from within the closed space formed by the mold and flexible membrane and then the air outside of the closed space applies pressure through the flexible membrane. In one implementation, this pressure is 1 atmosphere. For autoclave cure, in one implementation, compressed gas is added to the autoclave vessel which presses against the outside of the flexible membrane. These implementations are merely exemplary, and other implementations may also be used.

In this implementation, the curing step is followed by cutting, trimming, and chamfering the stabilized core to the desired detailed configuration (Block 590). In one implementation, cutting and trimming may be performed using customary methods, that is, a hand held utility knife to trim the periphery and then sandpaper to create the chamfer, or a bandsaw to trim the periphery and then to cut the chamfer, or a numerically controlled router with a rotating blade to trim and chamfer the core in one operation. This implementation is merely exemplary, and other implementations may also be used.

The stages in FIG. 5B are merely exemplary, and other stages and other implementations may also be used.

It should be appreciated that the resulting product of stabilization process 500 or stabilization process 550 will be a core with one surface stabilized and sealed. Due to the use of a roll-coated adhesive, the resulting core will be of a lighter weight than existing stabilized core. Stabilization process 500 of FIG. 5A is preferable for relatively flat and simple core contours. Stabilization process 550 of FIG. 5B may be used to stabilize and seal core with simple contours or with complex or compound contours. In addition, stabilization process 550 of FIG. 5B may also be used if the desired core size is larger than can be made from a single sheet of core stock. These implementations are merely exemplary, and other implementations may also be used.

FIG. 6 schematically illustrates a core with one surface stabilized consistent with an embodiment of the invention, as shown in FIGS. 5A-5B. The thickness of the layers is schematic and actual layer thicknesses are not being depicted. As shown in FIG. 6, one surface stabilized core 600 comprises a core 610, a roll-coated adhesive 620, a stabilizing material 630 and a thermoplastic film 640. Core 610, roll-coated adhesive 620, stabilizing material 630, and thermoplastic film 640 refers to the materials described above (for example, core 305, roll-coated adhesive 310, stabilizing material 320, and thermoplastic film 330 of FIG. 3). This implementation is merely exemplary, and other implementations may also be used.

As shown in FIG. 6, roll-coated adhesive 620 has been placed on core 610, stabilizing material 630 has been placed on roll-coated adhesive 620, and thermoplastic film 640 has been placed on stabilizing material 630. In one implementation, one surface stabilized core 600 may be created using one of the methods of FIGS. 5A and 5B. These implementations are merely exemplary, and other implementations may also be used.

FIG. 7 is a diagram illustrating methods of stabilizing and sealing all surfaces of a core consistent with an embodiment of the present invention. As described above, in some circumstances, it is desirable to stabilize and seal all surfaces of a core. With respect to FIGS. 7-9, "core" refers to the core materials described above. As shown in FIG. 7, in one implementation, all surfaces core stabilization and sealing 700 may be achieved using one of three methods: one surface stabilize, machine core, stabilize remaining surfaces 720; stabilize opposing surfaces, machine core, stabilize machined surfaces 740; and machine core, stabilize all surfaces 760. One surface stabilize, machine core, stabilize remaining surfaces 720 is depicted in FIG. 8A. Stabilize all surfaces, machine core, stabilize machined surfaces 740 is depicted in FIG. 8B. Machine core, stabilize all surfaces 760 is depicted in FIG. 8C. This implementation is merely exemplary, and other implementations may be used.

FIG. 8A is a flow diagram illustrating all surfaces core stabilization and sealing consistent with an embodiment of the present invention. As shown in FIG. 8A, in one implementation, all surfaces core stabilization and sealing is achieved by a stabilization and sealing process 800. Stabilization and sealing process 800 comprises cut oversize core 805, stabilize first surface 810, machine core 815, and stabilize remaining surfaces 820.

In this implementation, stabilization process 800 begins with cutting a core piece to a shape larger than the final desired core shape (Block 805). In this implementation, the next step is stabilizing one surface of the oversized core (Block 810). In one implementation, the stabilization of the surface is accomplished using one of the methods and the materials described in FIGS. 5A-5B.

In this implementation, the step of stabilizing a first surface of the core is followed by cutting and trimming (machining) the one-surface stabilized core to a desired shape (Block 815). Cutting and trimming may include trimming periphery to desired plan form, cutting a chamfer on core edges and/or cutting of core to varying thickness or thicknesses.

In this implementation, the next step is stabilizing the remaining surfaces of the core (Block 820). Stabilizing the remaining surfaces of the core comprises stabilizing any non-stabilized surfaces of the core including the chamfers of the core. In one implementation, the stabilization of the remaining surfaces is accomplished using one of the methods and the materials described in FIGS. 5A-5B. In another implementation, if foam core is used, not all of the edges may be stabilized.

The stages in FIG. 8A are merely exemplary, and other stages and other implementations may also be used.

FIG. 8B is a flow diagram illustrating all surfaces core stabilization and sealing consistent with another embodiment of the present invention. As shown in FIG. 8B, in another implementation, all surfaces core stabilization and sealing is achieved by a stabilization and sealing process 830. Stabilization and sealing process 830 comprises stabilize opposing surfaces of core 835, machine core 840, and stabilize machined surfaces 845.

In this implementation, stabilization and sealing process 830 begins with stabilizing opposing surfaces of the core (Block 835). The opposing surface of the core are those surfaces typically considered the top and bottom surfaces of the core and for which the distance between would be considered the thickness of the core. In one implementation, the stabilization of the opposing surfaces is accomplished using one of the methods and the materials described in FIGS. 5A-5B. In another implementation, fairing bars are used during the stabilization process (as described in FIG. 5B) to hold the core to a specific plan form.

In this implementation, the next step is cutting and trimming (machining) of the stabilized core to the desired shape (Block 840). In this implementation, the final step is stabilizing the surfaces that were machined during the preceding step (Block 840). In one implementation, the stabilization of the machined surfaces is accomplished using one of the methods and the materials described in FIGS. 5A-5B.

The stages in FIG. 8B are merely exemplary, and other stages and other implementations may also be used.

FIG. 8C is a flow diagram illustrating all surfaces core stabilization and sealing consistent with another embodiment of the present invention. As shown in FIG. 8C, in another implementation, all surfaces core stabilization and sealing is achieved by a stabilization and sealing process 860. Stabilization and sealing process 860 comprises machine core 865 and stabilize all surfaces 870.

In this implementation, stabilization and sealing process 860 begins with cutting and trimming (machining) of the core to the desired shape (Block 865). In this implementation, the final step is stabilizing all surfaces of the core (Block 870). In one implementation, the stabilization of all the surfaces is accomplished using one of the methods and the materials described in FIGS. 5A-5B.

The stages in FIG. 8C are merely exemplary, and other stages and other implementations may also be used.

The methods of FIGS. 8A-8C result in stabilization of all the surfaces of the core. It will be appreciated that the stabilization of all the surfaces results in a thermoplastic barrier on all surfaces, thereby sealing the core. Therefore, while the description above speaks only of stabilizing each surface the result of those methods is a stabilized and sealed core. In the case of honeycomb core, all surfaces should be sealed as discussed above to adequately prevent resin intrusion. In the case of foam core, however, some edges may not be sealed.

FIG. 9 schematically illustrates an all surfaces stabilized and sealed core consistent with an embodiment of the invention. The thickness of the layers is schematic and actual layer thicknesses are not being depicted. As shown in FIG. 9, all surfaces stabilized and sealed core 900 comprises a core 910, a roll-coated adhesive 920, a stabilizing material 930 and a thermoplastic film 940. Core 910, roll-coated adhesive 920, stabilizing material 930, and thermoplastic film 940 refers to the materials described above (for example, core 305, roll-coated adhesive 310, stabilizing material 320, and thermoplastic film 330 of FIG. 3) This implementation is merely exemplary, and other implementations may also be used.

As shown in FIG. 9, on each surface, roll-coated adhesive 920 has been placed on core 910, stabilizing material 930 has been placed on roll-coated adhesive 920, and thermoplastic film 940 has been placed on stabilizing material 930. In one implementation, all surfaces stabilized thick core 900 may be created using one of the methods of FIGS. 8A-8C. These implementations are merely exemplary, and other implementations may also be used.

The stabilization and/or sealing of core in the manner described in FIGS. 1-9 provides several advantages. The stabilizing and sealing materials described above are lower cost and lighter weight parts than those presently used. In addition, in one implementation, the stabilization material is formed of the same composite skin material as the rest of the structure. In this implementation, it is unnecessary to place a separate layer of composite material in the area of the core to form the composite structure. This results in lower weight and lower cost and provided for greater integration with the rest of the structure. In addition, the thermoplastic film can be readily bonded to other layers of composites used to form the composite structure and does not require the use of separate structures such as "peel plys." Thus, labor costs are reduced because no labor is necessary to prepare stabilized or sealed core surfaces for bonding to the composite skin material As described above, methods of manufacturing composite structures typically involve laying up composite material stacks including composite material stacks with core in a tooling and then curing those materials to form the structure. FIG. 10 schematically illustrates composite part layup using a core with at least one surface stabilized consistent with an embodiment of the invention. As shown in FIG. 10, in present systems, a composite part is constructed by the lay up of composite materials 1000 on tooling 1030. The composite part may be constructed using one of the methods described previously, such as a RTM process. Tooling 1030 may be any tooling suitable for creating the shape of the composite part.

Composite materials 1000 include composite skin plies 1020 and core 1010. Composite skin plies 1020 may be any suitable composite for constructing a desired composite structure. In FIG. 10, core 1010 is a core with at least one surface stabilized according to the methods described above. In FIG. 10, however, the stabilizing layer used to stabilize at least one surface of core 1010 is not constructed of the same material as composite skin plies 120. As shown in FIG. 10, when constructing a part using core 1010, composite skin plies 1020 must be laid up on the tooling around all the surfaces of core 1010.

As described above, in an implementation in which the stabilization material is formed of the same composite skin material as the rest of the structure, it is unnecessary to place a separate layer of composite material in the area of the core to form the composite structure. Therefore, as opposed to the manufacturing method disclosed in FIG. 10, the use of a core stabilized consistent with this implementation of the invention eliminates the need for having composite skin plies on stabilized surfaces of the core. This is further illustrated in FIGS. 11 and 12. FIGS. 11-12 schematically illustrate the lay up of composite material stacks including core that has been stabilized on one surface (FIG. 11) and core that has been stabilized and sealed on all surfaces (FIG. 12) in which the stabilization material is formed of the same composite skin material as the rest of the structure.

FIG. 11 schematically illustrates composite part layup using a core with one surface stabilized consistent with an embodiment of the invention, as shown in FIG. 6. The thickness of the layers is schematic and actual layer thicknesses are not being depicted. As shown in FIG. 11, in one implementation, a composite part is constructed by the lay up of composite materials 1100 on tooling 1180. The composite part may be constructed using one of the methods described previously, such as a RTM process. Tooling 1180 may be any tooling suitable for creating the shape of the composite part.

Composite materials 1100 include composite skin ply 1105, one-surface stabilized core 1110, and skin doublers 1140 and 1150. Composite skin plies include any composite skin materials suitable to create a composite structure. One-surface stabilized core 1110 is a core with one surface stabilized according to one of the methods depicted in FIGS. 5A-5B. In this implementation, one-surface stabilized core 1110 includes a stabilization layer 1120 in which the stabilization layer is constructed of the same composite material as composite skin ply 1105. In one implementation, one-surface stabilized core 1110 includes an adhesive layer 1130 on the non-stabilized surface of the core. Adhesive layer 1130 is used to bond one-surface stabilized core 1110 to composite skin ply 1105. In one implementation, adhesive layer 1130 may be a roll-coated adhesives, such as one of the roll-coated adhesives described previously.

As shown in FIG. 11, and as opposed to FIG. 10, in this implementation, a composite skin ply is not located below one-surface stabilized core 1110. The composite skin ply may be eliminated because stabilization layer 1120 comprises a composite skin ply as a stabilization material. In this implementation, composite skin doublers 1140 and 1150 are instead laid up on mold 1180 in the area of one-surface stabilized core 1110 and extend partially under one-surface stabilized core 1110. Composite skin doublers 1140 and 1150 are plies of composite material. In one implementation, composite skin doublers 1140 and 1150 are constructed of the same material as composite skin ply 1105. Skin doublers 1140 and 1150 allow the strength of the stabilizing material in stabilization layer 1120 to carry load or transfer force from one edge of the composite part to the other edge. These implementations are merely exemplary, and other implementations may also be used.

In one implementation, as shown in FIG. 11, skin doublers 1140 and 1150 extend under one-surface stabilized core 1110 approximately 0.75 to 1.0 inch past core chamfer break points 1160 and 1165. In another implementation (not shown), skin doublers 1140 and 1150 extend under one-surface stabilized core 1110 approximately 0.75 to 1.0 inch past core edges 1170 and 1175. These implementations are merely exemplary, and other implementations may also be used.

FIG. 12 illustrates composite part layup using a core with all surfaces stabilized and sealed consistent with an embodiment of the invention. The thickness of the layers is schematic and actual layer thicknesses are not being depicted. As shown in FIG. 12, in one implementation, a composite part is constructed by the lay up of composite materials 1200 on a tooling 1280. The composite part may be constructed using one of the methods described previously, such as a RTM process. Tooling 1280 may be any tooling suitable for creating the shape of the composite part.

Composite materials 1200 include composite skin plies (not shown), all surfaces stabilized and sealed core 1210, and skin doublers 1240, 1250, 1260, and 1270. Composite skin plies include any composite skin materials suitable to create a composite structure. All surfaces stabilized and sealed core 1210 is a core with all surfaces stabilized and sealed according to one of the methods depicted in FIGS. 8A-8C. In this implementation, all surfaces stabilized and sealed core 1210 includes a stabilization layer 1220 in which the stabilization layer is constructed of the same composite material as the composite skin plies used to create the composite structure.

As shown in FIG. 12, and as opposed to FIG. 10, in this implementation, composite skin plies are not located above and below all surfaces stabilized and sealed core 1210. The composite skin plies may be eliminated because stabilization layer 1220 comprises a composite skin ply as a stabilization material. In this implementation, composite skin doublers 1240, 1250, 1260 and 1270 are laid up on mold 1280 in the area of all surfaces stabilized and sealed core 1210 and extend partially under and over all surfaces stabilized and sealed core 1210. Composite skin doublers 1240, 1250, 1260, and 1270 are plies of composite material. In one implementation, composite skin doublers 1240, 1250, 1260, and 1270 are constructed of the same material as the composite skin plies used to create the composite structure. Skin doublers 1240, 1250, 1260 and 1270 allow the strength of the stabilizing material in stabilization layer 1220 and 1230 to carry load or transfer force from one edge of the composite part to the other edge. This implementation is merely exemplary, and other implementations may also be used.

In one implementation, as shown in FIG. 12, skin doublers 1240 and 1250 extend under all surfaces stabilized and sealed core 1210 approximately 0.75 to 1.0 inch past core chamfer break points 1290 and 1295 and skin doublers 1260 and 1270 extend over all surfaces stabilized and sealed core 1210 approximately 0.75 to 1.0 inch past core chamfer break points 1290 and 1295. In another implementation (not shown), skin doublers 1240 and 1250 extend under all surfaces stabilized and sealed core 1210 approximately 0.75 to 1.0 inch past core edges 1285 and 1287 and skin doublers 1260 and 1270 extend over all surfaces stabilized and sealed core 1210 approximately 0.75 to 1.0 inch past core edges 1285 and 1287. These implementations are merely exemplary, and other implementations may also be used.

After lay up as described in FIGS. 10-12, the composite materials may be cured to form the composite structure utilizing a number of known methods. An example of one of these methods is disclosed in U.S. patent application Publication No. 2002/0069962.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A method of stabilizing and sealing a core to be used in a composite structure comprising:
   applying a first thermoplastic barrier film to a first stabilizing material;
   rolling a first layer of roll-coated adhesive on a top surface of the core and a bottom surface opposing that top surface to form a first roll-coated adhesive layer on the core;
   applying the first thermoplastic barrier film and first stabilizing material on the core such that the first roll-coated adhesive layer is against the first stabilizing material and the first thermoplastic barrier film covers the top and bottom surfaces of the core;
   curing the first stabilizing material to form a core with stabilized top and bottom surfaces;
   machining the core to a desired shape;
   applying a second thermoplastic barrier film to a second stabilizing material;
   rolling a second layer of roll-coated adhesive on all machined surfaces of the core to form a second roll-coated adhesive layer on the machined surfaces of the core;
   applying the second thermoplastic barrier film and second stabilizing material on the core such that the second roll-coated adhesive layer is against the second stabilizing material and the thermoplastic barrier film covers the machined surfaces of the core; and
   curing the second stabilizing material to form a stabilized and sealed core.

2. The method of claim 1, wherein the first and second layers of roll-coated adhesive include a liquid epoxy resin.

3. The method of claim 2, wherein the liquid epoxy resin includes tougheners.

4. The method of claim 1, wherein the first and second stabilizing materials include a ply of composite skin material.

5. The method of claim 4, wherein the composite skin material is impregnated with resin.

6. The method of claim 4, wherein the composite skin material includes carbon fiber impregnated with an epoxy resin.

7. The method of claim 6, wherein the carbon fiber has been wound so that substantially no gaps exist between adjacent bands of fibers.

8. The method of claim 6, wherein the epoxy resin includes a curing agent.

9. The method of claim 1, wherein the first and second thermoplastic barrier films include a polyetherimide thermoplastic barrier film.

10. The method of claim 1, wherein the first and second thermoplastic barrier films include a polyvinyl fluoride film.

11. The method of claim 1, wherein rolling a first layer of roll-coated adhesive on a surface of the core and rolling a second layer of roll-coated adhesive on unstabilized surfaces of the core further comprises using a powered paint roller to roll the adhesive.

12. The method of claim 11, further comprising weighing the core to determine when a predetermined amount of roll-coated adhesive has been applied to the core.

13. The method of claim 1, wherein curing the first stabilizing material further comprises placing the core with the first thermoplastic barrier film and first stabilizing material in a heated platen press to cure the first stabilizing material; and wherein curing the second stabilizing material further comprises placing the core with the second thermoplastic barrier film and second stabilizing material in a heated platen press to cure the second stabilizing material.

14. The method of claim 1, wherein curing the first stabilizing material further comprises:
   placing the core with the first thermoplastic barrier film and first stabilizing material in tooling;
   placing a first flexible membrane over the core with the first thermoplastic barrier film and first stabilizing material; and
   applying heat and pressure to the core with the first thermoplastic barrier film and first stabilizing material to cure the first stabilizing material;
   wherein curing the second stabilizing material further comprises:
   placing the core with the second thermoplastic barrier film and second stabilizing material in tooling;
   placing a second flexible membrane over the core with the second thermoplastic barrier film and second stabilizing material; and
   applying heat and pressure to the core with the second thermoplastic barrier film and second stabilizing material to cure the second stabilizing material.

15. The method of claim 14, wherein the first and second flexible membranes are impervious to air ingress.

16. The method of claim 14, wherein an autoclave applies heat and pressure to the core with the first thermoplastic barrier film and first stabilizing material to cure the first stabilizing material and applies heat and pressure to the core with the second thermoplastic barrier film and second stabilizing material to cure the second stabilizing material.

* * * * *